J. R. Baylis,
Screw Propeller.
No. 1,321. Reissued July 1, 1862.
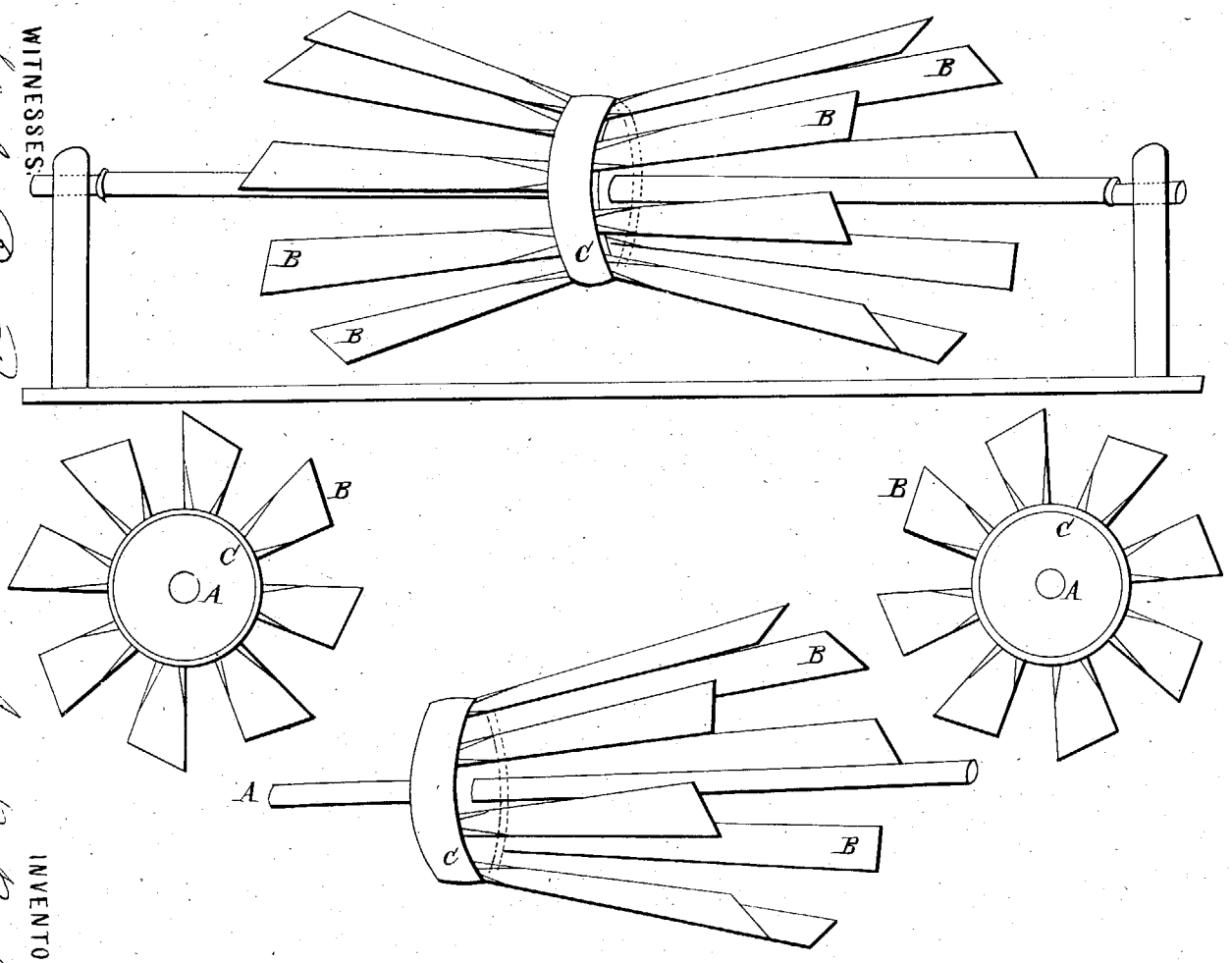
WITNESSES:
Franklin Pierce
John S. Wilkinson
INVENTOR:
Jas. R. Baylis

UNITED STATES PATENT OFFICE.

JAMES R. BAYLIS, OF BALTIMORE, MARYLAND.

IMPROVED DOUBLE-CONE MARINE PROPELLER.

Specification forming part of Letters Patent No. 33,874, dated December 10, 1861; Reissue No. 1,321, dated July 1, 1862.

*To all whom it may concern:*

Be it known that I, JAMES R. BAYLIS, of Baltimore city, State of Maryland, have invented new and useful Improvements in Propellers; and I do hereby declare that the following is a full and exact description thereof, reference being had to the accompanying drawings, and to the letters of reference marked thereon, making a part of this specification.

The nature of my invention consists in the arrangement and construction of oars or blades on a center or hub at alternate distances, forming a double or single cone-shaped propeller.

To enable others skilled in the art to make and use my invention, I will proceed to describe its construction and operation.

A represents the shaft of the propeller, which is double or single cone-shaped, and formed of oars or blades B, set alternately and at equal distances apart and fastened permanently to their center or hub C. They are narrower at the center and wider at the outer end of the cone. Their outer or feather ends are set obliquely to the shaft and in a reverse position or angle to the opposite outer ends of oars. The advantage is there is the same result of power in low shoal of water as in deep water, and a longitudinal shape has a greater purchase on the line of water than the ordinary circular paddle-wheel or screw-propeller.

Another great advantage I obtain over the ordinary circular paddle-wheel or screw-propeller is that I obtain a much greater speed from the same power and same diameter of wheel, which peculiarly adapts it to light-draft vessels, for as the feather-ends of the front blades strike the water the water is forced between the blades to the outer circumference and by the spiral motion is again propelled from the circumference between the blades of the back end of the cone to the center of the shaft, thereby increasing the speed. The front blades drive the water from the center to the circumference, and the back blades drive the water from the circumference to the center. Therefore the operation of the propeller drives the boat backward, when necessary, by reversing the motion of the propeller with the same power and speed that the boat can be propelled forward.

What I claim as my invention, and desire to secure by Letters Patent, is—

The construction of a double or single cone-propeller having its oars or blades constructed and when arranged relatively to the hub or axis, substantially as and for the purpose herein described.

JAS. R. BAYLIS.

Witnesses:
J. FRANKLIN RAGART,
JOHN S. HOLLINGSHEAD.